US012652509B2

(12) United States Patent
Ying et al.

(10) Patent No.: US 12,652,509 B2
(45) Date of Patent: Jun. 9, 2026

(54) NETWORK EDGE DEPLOYMENT OF LOCATION BASED APPLICATIONS

(71) Applicant: T-Mobile USA, Inc., Bellevue, WA (US)

(72) Inventors: Wen-Ping Ying, Bellevue, WA (US); John Saw, Kirkland, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 524 days.

(21) Appl. No.: 18/193,335

(22) Filed: Mar. 30, 2023

(65) Prior Publication Data

US 2024/0334154 A1 Oct. 3, 2024

(51) Int. Cl.
*H04W 4/021* (2018.01)

(52) U.S. Cl.
CPC .................................. *H04W 4/021* (2013.01)

(58) Field of Classification Search
CPC ....... H04W 4/021; H04W 4/02; H04W 4/023; H04W 4/025; H04W 4/029
See application file for complete search history.

(56) References Cited

U.S. PATENT DOCUMENTS 9,271,110 B1 * 2/2016 Fultz ..................... H04W 4/029
10,929,494 B2 2/2021 Chamberlin et al.

2017/0147545 A1 * 5/2017 Amoli .................. G06Q 10/101
2018/0027372 A1 1/2018 Agarwal et al.
2021/0006972 A1 1/2021 Guim Bernat et al.
2023/0396455 A1 * 12/2023 Wane ........................ H04L 9/50

OTHER PUBLICATIONS

Ayoub, et al., "On the Deployability of Augmented Reality Using Embedded Edge Devices", IEEE 18th Annual Consumer Communications & Networking Conference, Jan. 9, 2021, pp. 1-6.
Search Report for European Application No. 24163175.3, Dated Jul. 22, 2024, 6 pages.

* cited by examiner

*Primary Examiner* — John J Lee
(74) *Attorney, Agent, or Firm* — Lee & Hayes, P.C.

(57) ABSTRACT

Techniques for deploying location based applications in a network are discussed herein. Such location based applications can be installed or implemented in a network node close to the base station and/or the location of the user equipment (UE) using the location based application in an environment. When a user is within a geofence area associated with the location based applications, the UE can present an indication that location based services are available instead of requiring a user to select an application on their own or thorough an application store. After the exchanging authentication information, the UE can use authentication information to send a request, along with location data or pose data of the UE, to an edge server to render content for presentation on the UE. The edge server can transmit the content to the UE for presenting content at the location in accordance with the location based application.

20 Claims, 9 Drawing Sheets

300

400

700

NETWORK
FUNCTIONS (NFs)
702

900

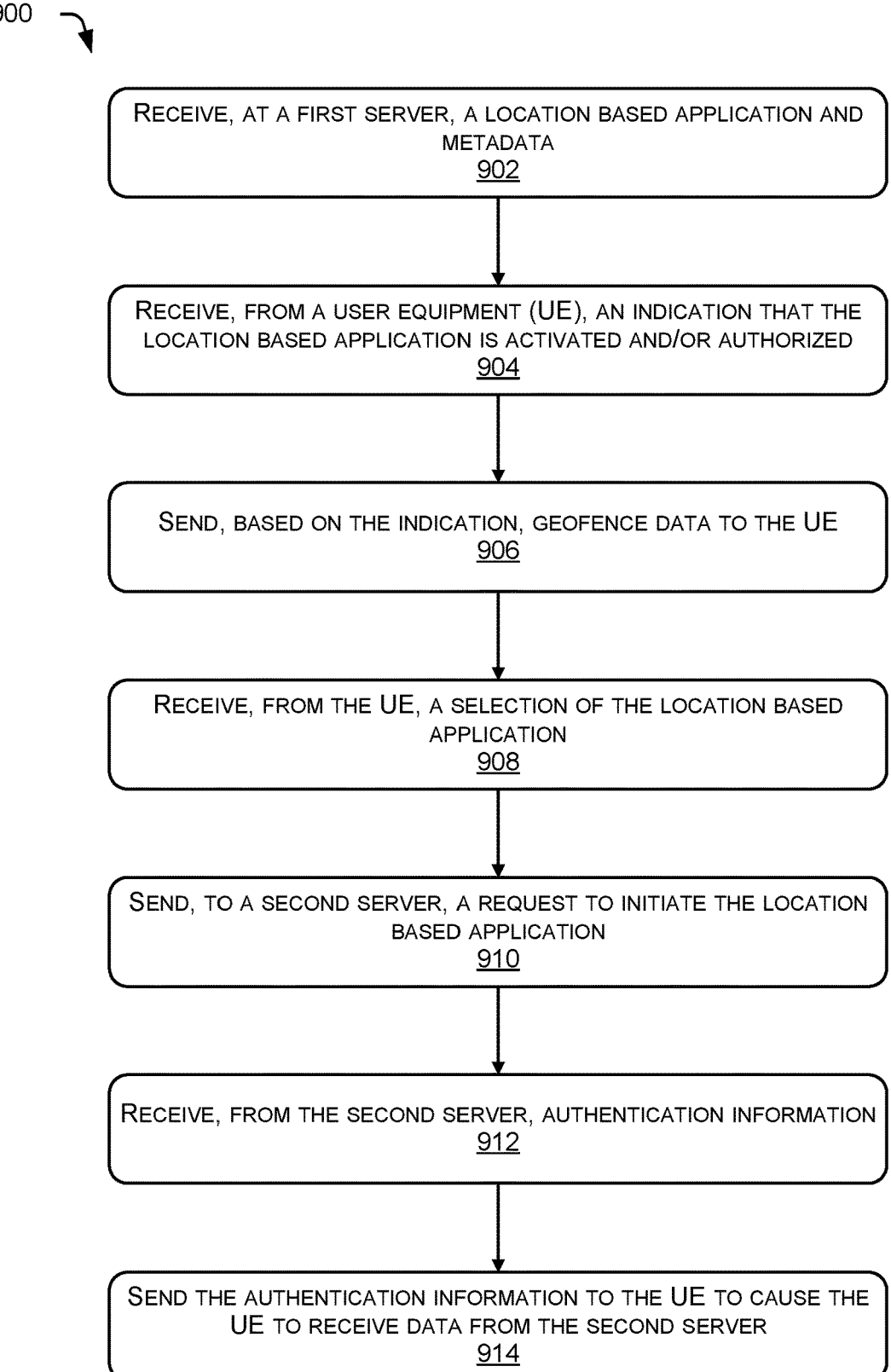

RECEIVE, AT A FIRST SERVER, A LOCATION BASED APPLICATION AND METADATA
902

RECEIVE, FROM A USER EQUIPMENT (UE), AN INDICATION THAT THE LOCATION BASED APPLICATION IS ACTIVATED AND/OR AUTHORIZED
904

SEND, BASED ON THE INDICATION, GEOFENCE DATA TO THE UE
906

RECEIVE, FROM THE UE, A SELECTION OF THE LOCATION BASED APPLICATION
908

SEND, TO A SECOND SERVER, A REQUEST TO INITIATE THE LOCATION BASED APPLICATION
910

RECEIVE, FROM THE SECOND SERVER, AUTHENTICATION INFORMATION
912

SEND THE AUTHENTICATION INFORMATION TO THE UE TO CAUSE THE UE TO RECEIVE DATA FROM THE SECOND SERVER
914

FIG. 9

NETWORK EDGE DEPLOYMENT OF LOCATION BASED APPLICATIONS

BACKGROUND

Modern terrestrial telecommunication systems include heterogeneous mixtures of second, third, and fourth generation (2G, 3G, and 4G) cellular-wireless access technologies, which can be cross-compatible and can operate collectively to provide data communication services. Global Systems for Mobile (GSM) is an example of 2G telecommunications technologies; Universal Mobile Telecommunications System (UMTS) is an example of 3G telecommunications technologies; and Long Term Evolution (LTE), including LTE Advanced, and Evolved High-Speed Packet Access (HSPA+) are examples of 4G telecommunications technologies. Telecommunications systems may include fifth generation (5G) cellular-wireless access technologies to provide improved bandwidth and decreased response times to a multitude of devices that may be connected to a network.

In some examples, locating services at an edge of a network can provide services to user equipment with reduced latency.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 9 depicts an example process for deploying a location based application in a telecommunication system.

DETAILED DESCRIPTION

Figure 1:
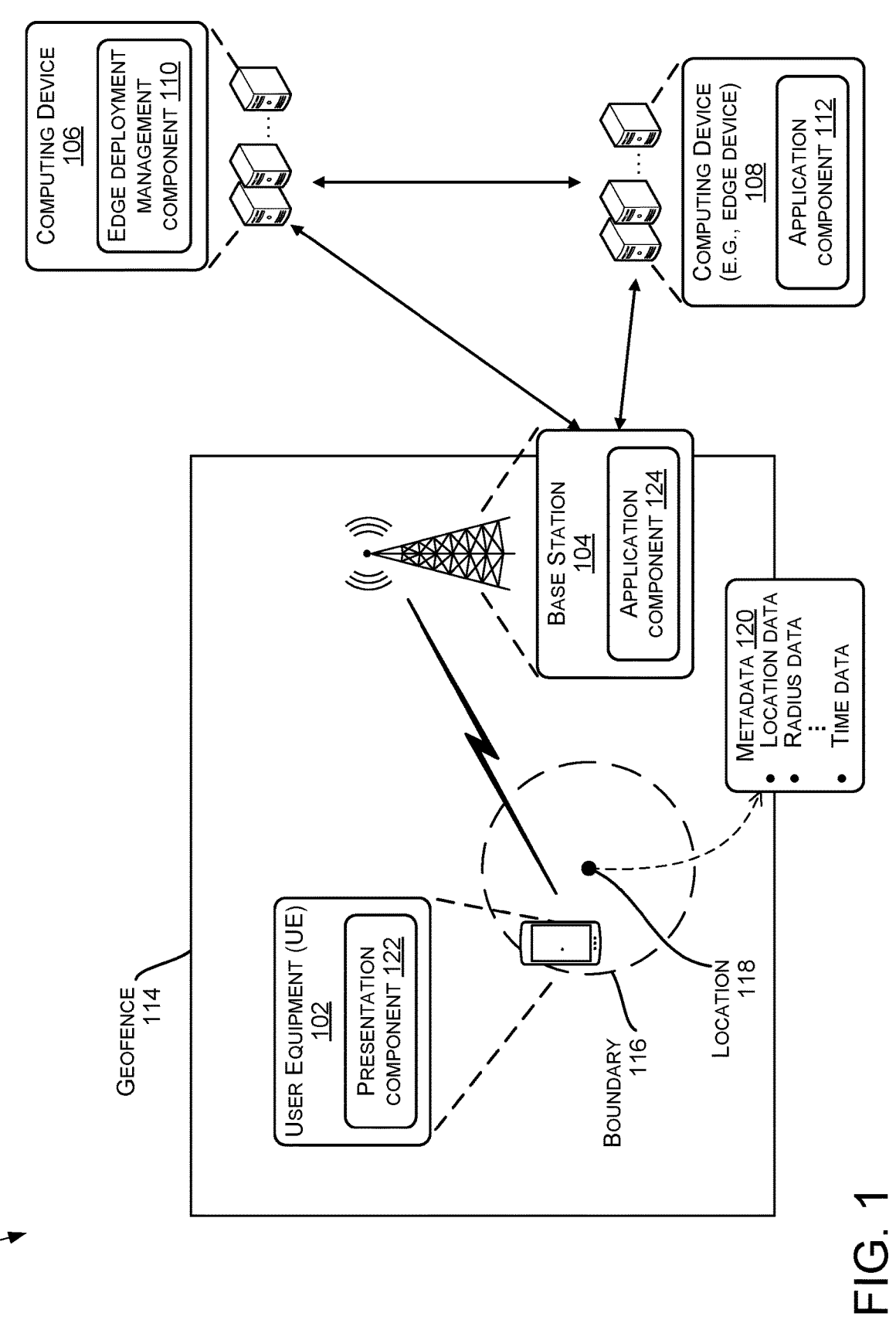
FIG. 1 depicts an example network environment in which an example telecommunication system implements an example location based application on a user equipment.

Techniques for deploying location based applications in a network are discussed herein. For example, a telecommunications network, such as a 5th Generation (5G) network, can implement location based applications in a network node based on a location associated with providing services associated with the location based application. In the context of an augmented reality application, for example, a location based application can be installed or implemented in a network node close to the base station and/or the location of the user equipment (UE) using the location based application in an environment. When a user is within geofence area associated with the location based applications, the UE can present an indication that location based services are available. In some examples, if a user is within a radius or geographic area associated with a specific location based application, an indication can be presented by the UE (e.g., a graphical indication, an audio indication, a haptic indication, etc.). If a user selects the indication or otherwise initiates the location based application, the UE can send a request to a first server (e.g., an edge deployment management server), which can send an instruction to a second server (e.g., an edge device or server) to begin an instance of the location based application. The edge server can generate authentication information based on the location based application and/or based on information associated with the UE (e.g., identity information) and can send the authentication information, along with connection information (e.g. IP and port address), for the application instance to the first server and ultimately to the UE via a secured channel. The UE can use the received authentication token to authenticate itself for the second server once connected using the received connection information and can send a request to the second server (e.g., along with or in addition to location information of the UE, display data (field of view, resolution) of the UE) to render content for presentation on the UE. The second server can transmit the content to the UE for presenting content associated with the UE at the location in accordance with the location based application.

In some examples, the location based application can include, but is not limited to, location specific applications such as tour guiding, route finding, venue guiding, shopping, and the like. In some examples, the location based application can be an augmented reality application that presents graphical elements (e.g., augmented reality elements) on a display of the UE at least partially in connection with elements existing in an environment proximate the UE. For example, in the context of a route finding application, a location based application can present directions on a UE to guide a user from a current location to a destination (e.g., a site of interest such as a shopping destination, a bathroom, and the like). Of course, any type of application can be used and the techniques are not limited to the specific examples discussed herein.

While the system and methods described herein are applicable to both augmented reality and virtual reality environments, for efficiency, the disclosure will use augmented reality ("AR") as an example but not in an exclusive sense. Augmented reality results when a computer-generated image is superimposed on a user's view of the physical world. The resulting composite view may be a live direct or indirect view of the physical world around a user. Such a live direct view may be considered a real-time view, that is, the view displayed to the user is provided as quickly as the hardware and software is able to capture, process, and display the view taking into consideration latency and processing time in displaying the view. In many such real-time views, there is no noticeable delay (or only very minor delays) that are perceptible to a human observer.

In many instances, an AR environment allows a user to move about in the physical world and the computer-generated superimpositions may change as the user moves around. In fact, a form of gaming may involve a user searching for virtual objects or characters (collectively, "virtual objects"), and moving toward these virtual objects allows the user to collect or otherwise interact with the virtual objects.

In some examples, techniques for onboarding a location base application into a network are described herein. For example, an application developer can write or otherwise generate a location based application. The application developer can send the application and metadata to an edge deployment server. In some cases, the metadata can include, but is not limited to, an application identifier, location data associated with the application (e.g., a latitude and/or longitude associated with activating the application), a radius or boundary associated with the location (e.g., defining an area of an environment in which the location based application may be used or may provide content), timing information (e.g., when the location based application may be used or when an initial indication is to be presented to a user), cost data (e.g., charging data per use, such as dollars per hour, dollars per use, etc.), and the like. Based on the metadata, the edge deployment server can send the application to an edge server associated with the location where the location based application is to be implemented. The edge server can be selected based on expected latency between the edge server and the location of the location based application, based on other applications running on the edge server (e.g., for load balancing), based on content to be rendered/streamed to a UE, and the like.

In some examples, a UE may opt into using location based applications prior to using the techniques discussed herein. For example, the UE may initially accept terms of service or otherwise enable use of the location based application. If the UE is associated with using location based applications, when the UE connects to a network (e.g., via a base station such as an eNodeB or an eNodeG), the UE can send a registration request to the edge deployment server. In response, the edge deployment server can determine geofence data and can provide such geofence data to the UE. In some cases, the geofence data can include a boundary in a physical environment that can identify location based applications and initial conditions to present an initial indication to a UE. For example, the geofence data can identify a first area of an environment that, when the UE is within the area and the UE has enabled location based applications, the UE can present one or more indications on the UE to allow a user to launch or otherwise activate a location based application.

In some examples, presenting icons or other graphical or non-graphical indications to a user on a UE in connection with activating location based applications overcomes challenges in deploying a location based application in an environment. For example, presenting an indication that an application is available prevents the user from having to actively seek out which application are available from other sources, such as an application store. The techniques discussed herein remove barriers to entry that would otherwise prevent a user from knowing about the existence of a location based application and can encourage use when the UE is near a location associated with such applications. This removes extra steps in activating an application which also reduces signaling in a network and reduces overall network congestion.

In some examples, the UE can determine a location of the UE using GPS, triangulation (e.g., with Wi-Fi and/or multiple base stations), a visual positioning system (VPS), accelerometer data, inertial measurement unit (IMU) data, and the like. The location of the UE can be used, along with geofence data, to determine when to present an initial indication to a user to launch an application and the location data can be used while operating the location based application to provide services (e.g., augmented reality services). In some examples, a coarse location of the UE can be determined to provide an initial estimate of the UE position (e.g., for the purposes of launching an application) and a fine location can be determined after the application is launched to provide a more accurate estimation of the location (e.g., for route finding, presenting augmented reality elements, and the like).

In some examples, an edge device can render content and can provide such content to a UE to be rendered at the UE for presentation. In some examples, because the location based application can be deployed to an edge device based on the location of the location based application, latency can be minimized to provide real time or near-real time content to the UE. In some examples, the UE can include a rendering client to render the content provided directly from the edge server such that an application is not "run" on the UE, and instead the UE is simply presenting content provided by the edge server. Accordingly, the techniques discussed herein can provide low latency, can shift processing to more powerful edge devices, and can minimize signaling to activate location based application(s) on UEs throughout a telecommunication network.

The techniques discussed herein can be implemented in the context of protocols associated with one or more of 3G, 4G, 4G LTE, and/or 5G protocols. In some examples, the network implementations can support standalone architectures, non-standalone architectures, dual connectivity, carrier aggregation, etc. Example implementations are provided below with reference to the following figures.

FIG. 1 depicts an example network environment 100 in which an example telecommunication system implements an example location based application on a user equipment (UE) 102. In some examples, the UE 102 may be coupled with a base station 104 to communicate with a computing device 106 and/or a computing device 108. In some cases, the computing device 106 may be a first server and may include or otherwise implement an edge deployment management component 110. In some cases, the computing device 108 may be a second server and may include or otherwise implement an application component 112 for rendering content for presentation via the UE 102. In some cases, the computing device 108 may be considered to be an edge device such that that the computing device 108 can provide low latency content to the UE 102 to facilitate operation of the location based applications, as discussed herein.

FIG. 1 further depicts the UE 102 within a geofence 114 and within a boundary 116 associated with a location 118. As discussed herein, the boundary 116 and the location 118 can be defined by metadata 120 associated with a location based application. In some examples, a location based application can be run on the UE 102 and/or on a computing device 108 (e.g., the edge device). That is, once the location based application is activated (as discussed throughout this disclosure), the computing device 108 can generate content to the application component 112 and can send the content to the UE 102 via the base station 104 to be presented on the UE 102 via the presentation component 122. In some examples, the base station 104 can include an application component 124 instead of or in addition to the application component 112 in the computing device.

In some examples, the UE 102 can be any device that can wirelessly connect to the telecommunication network. In some examples, the UE 102 can be a mobile phone, such as a smart phone or other cellular phone. In other examples, the UE 102 can be an augmented reality device (e.g., a device (e.g., glasses, a smartphone, a headset, etc.) capable of running augmented reality application(s)), a personal digital assistant (PDA), a media player, a tablet computer, a gaming device, a smart watch, a hotspot, a personal computer (PC) such as a laptop, desktop, or workstation, or any other type of computing or communication device.

In some examples, the network environment 100 can have one or more access networks that include base stations (e.g., the base station 104) and/or other access points, as well as a core network linked to the access network. The access networks and/or the core network can be compatible with one or more radio access technologies, wireless access technologies, protocols, and/or standards, such as 5G NR technology, LTE/LTE Advanced technology, other Fourth Generation (4G) technology, High-Speed Data Packet Access (HSDPA)/Evolved High-Speed Packet Access (HSPA+) technology, Universal Mobile Telecommunications System (UMTS) technology, Code Division Multiple Access (CDMA) technology, Global System for Mobile Communications (GSM) technology, WiMAX technology, Wi-Fi technology, and/or any other previous or future generation of radio access technology.

In some examples, the base station 104 can be implemented in the context of an LTE access network known as an Evolved UMTS Terrestrial Radio Access Network (E-UTRAN). Base stations of the LTE access network can be known as eNBs. The base station 104 can also be implemented in the context of 5G access network with base stations known as gNBs. In some examples, the base station 104 can represent an eNB and a gNB located at a same cell site. In other examples, the base station 104 can represent an eNB and a gNB located at different cell sites.

The base station 104 can be implemented to support dual connectivity between the UE 102 and multiple base stations in an access network. For example, the UE 102 can establish an LTE connection with an eNB and a 5G connection with an gNB, where such a connection can be referred to as an E-UTRAN New Radio-Dual Connectivity (EN-DC) connection. An EN-DC connection may be based on a 3GPP EN-DC configuration, such as an "option 3x" EN-DC configuration, "option 3" EN-DC configuration, "option 3a" EN-DC configuration, or other EN-DC configuration.

In some examples, the computing device(s) 106 and/or 108 can be a part of core network(s) that can represent a service-based architecture that includes multiple types of network functions that process control plane data and/or user plane data to implement services for various devices. In some examples, the services comprise the location based applications which may include a text, a data file transfer, an image, a video, a combination thereof, and so on. The network functions of the core network(s) can include an Access and Mobility Management Function (AMF), a Session Management Function (SMF), a User Plane Function (UPF), a Policy Control Function (PCF), and/or other network functions implemented in software and/or hardware, just to name a few. Examples of network functions are also discussed in relation to FIG. 7, and elsewhere.

In some examples, the edge deployment management component 110 can include functionality to ingest new applications in a network, deploy a location based application to an edge server, send geofence data to the UE 102, and facilitate a request to start up a location based application in an environment. Additional details of the edge deployment management component 110 are discussed in connection with FIGS. 3-6 and 9, as well as throughout this disclosure.

In some examples, the presentation component 122 can include functionality to determine a location of the UE 102 in an environment with respect to a geofence and/or a boundary associated with a location based application. In some examples, the presentation component 122 can present a first indication that a location based application is available when the UE 102 is within the geofence 114. In some examples, when the UE 102 receives a request to initiate a location based application (and/or when the UE 102 is within the boundary 116), the UE can ultimately receive content from the application components 112 and/or 124 and can render or otherwise present the content via the presentation component 122. In some examples, the edge device 108 can push content to the UE at any regular or irregular intervals, based on updated location information of the UE, and the like. Additional details of the presentation component 122 are provided in connection with FIGS. 2, 3, 5, 6, and 9, as well as throughout this disclosure.

Figure 2:
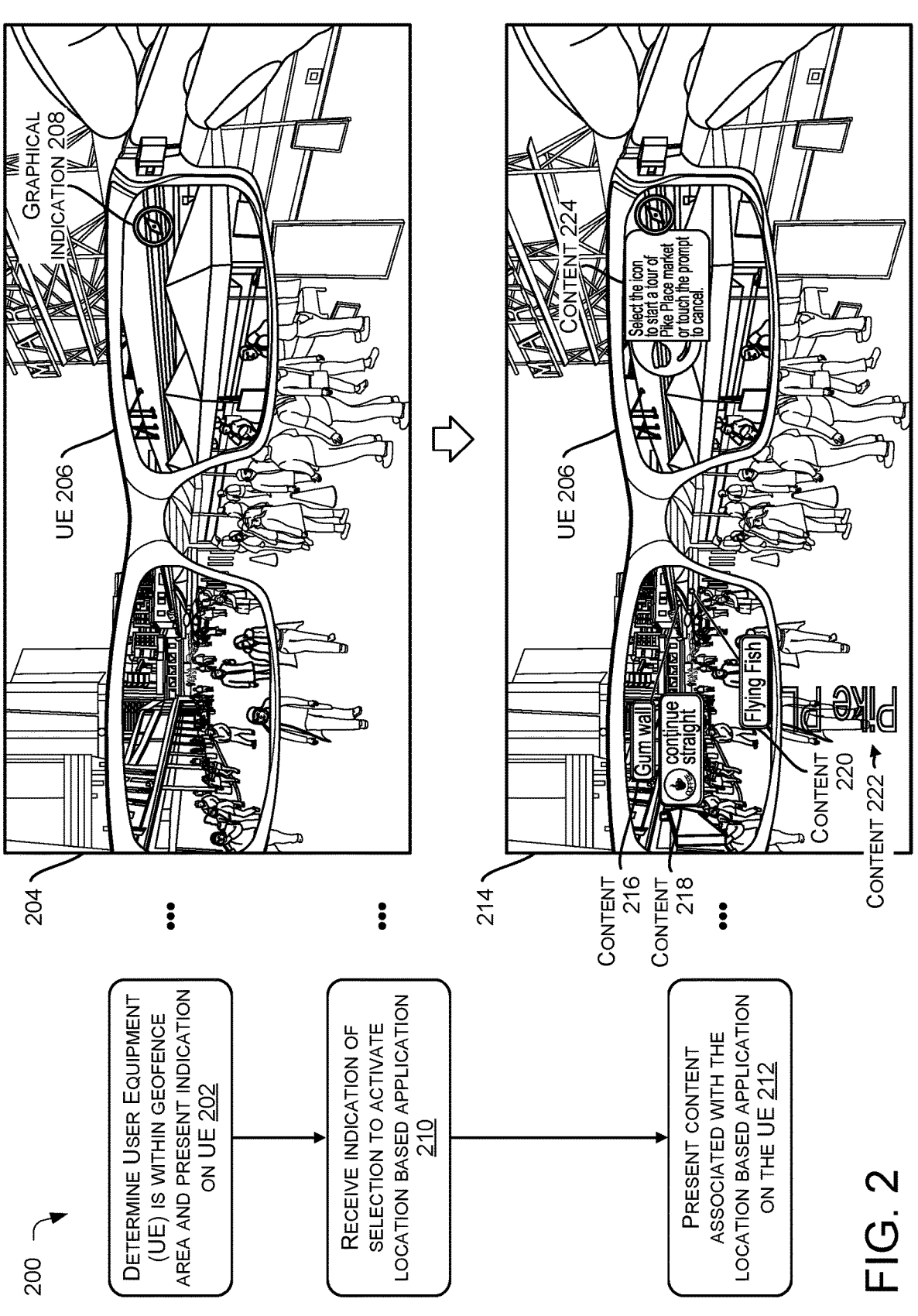
FIG. 2 depicts a pictorial flow diagram illustrating techniques for initiating a location based application on a user equipment.

FIG. 2 depicts a pictorial flow diagram 200 illustrating techniques for initiating a location based application on a user equipment.

At operation 202, the process can include determining that a UE is within a geofence area, and at least partially in response, can include presenting an indication on the UE. An example 204 illustrates a UE 206 presenting a graphical indication 208 on a display of the UE 206. In this example 204, the UE 204 is a pair of smart glasses capable of displaying content on the lenses while also allowing a user to look through the lenses. Of course, the UE 204 can be implemented as any device described herein.

In some examples, the operation 202 can include the UE 206 determining its location with respect to a geofenced area. In some examples, the UE 206 can receive geofence data and can determine a coarse location (e.g., via GPS, A-GPS, triangulation, etc.) and/or a fine location (e.g., using a visual positioning system (VPS), and the like). Once the UE 206 determines that it is within the geofence area, the UE 206 can present the graphical indication 208 to allow a user to launch one or more location based applications. In some examples, the operation 202 can include presenting a textual indication, an audio indication, a haptic indication, and the like. Additional details of a geofence are discussed in connection with FIG. 3 and throughout this disclosure.

At operation 210, the process can include receiving an indication of a selection to activate a location based application. For example, a user can activate a location based application (e.g., provide input to the UE 206 to launch or open the location based application) associated with or represented by the graphical indication 208.

At operation 212, the process can include presenting content associated with the location based application on the UE. An example 214 illustrates content 216, 218, 220, 222, and 224. For example, the content 216-224 may include an augmented reality guide application for Pike Place market including illustrated directions to different attractions such as a gum wall (e.g., content 216), a coffee shop (e.g., content 218), a fish market (e.g., content 220), and/or a street name (e.g., content 222). Further, additional content may present additional selections and/or indications of text for the tour (e.g., content 224). Of course, it can be appreciated that the content 216-224 is not limited to the examples provided herein and may vary depending on the nature of such location based applications.

Figure 3:
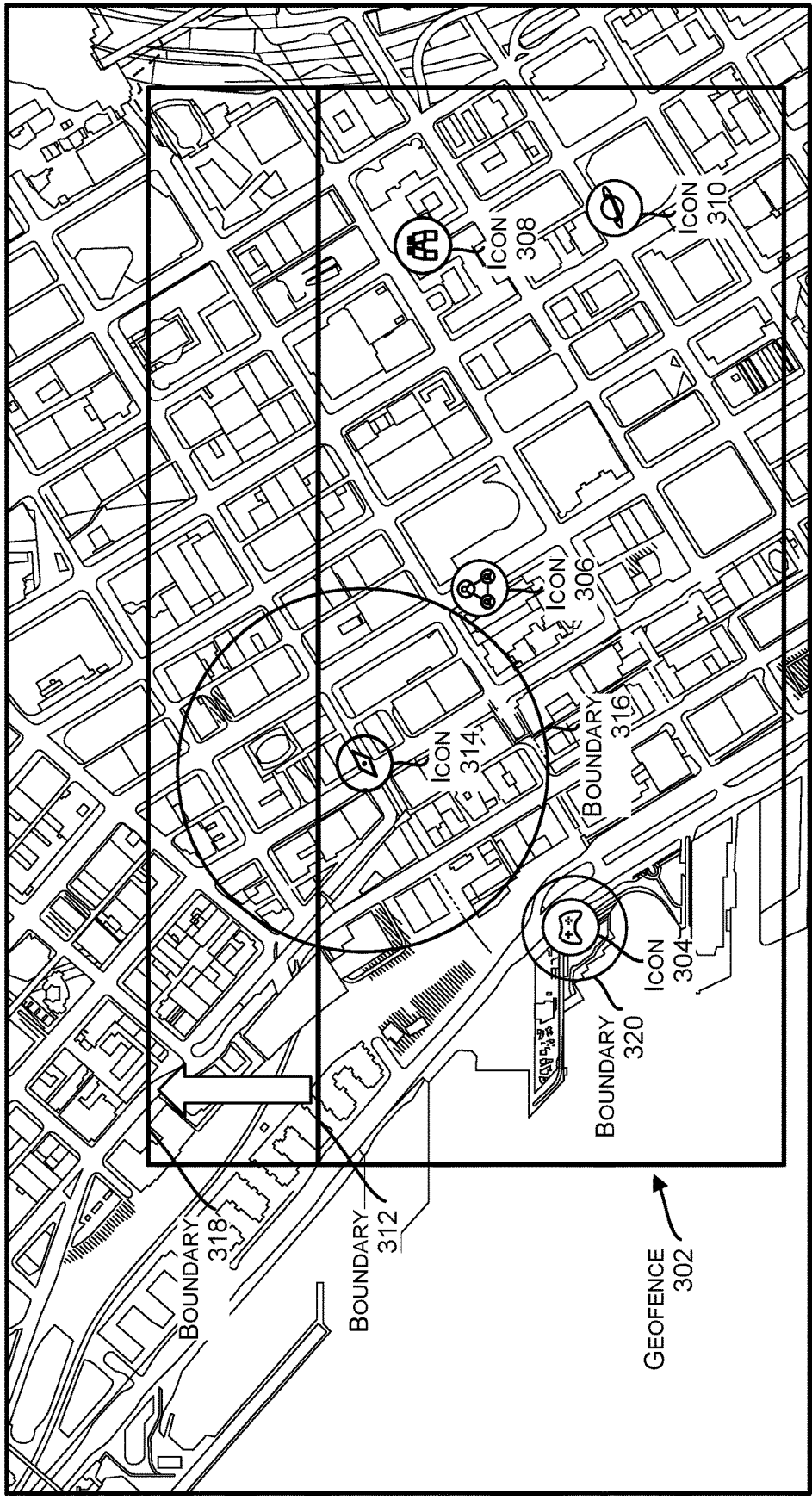
FIG. 3 depicts a map of an environment including example representations of expanding a geofence area based on location based applications.

FIG. 3 depicts a map 300 of an environment including example representations of expanding a geofence area based on location based applications. As illustrated, the map 300 represents a portion of downtown Seattle, although the techniques are not so limited. The map 300 illustrates a geofence 302. Consider a first case where the geofence bounds the icons 304, 306, 308, and 310, whereby the icons represent different locations associated with various location based applications. If a UE is within the geofence 302 (with a top boundary 312 at a first time), the UE will present a graphical indication to allow a user to launch a location based application. If another location based experience is added to the geofence area 302 (and that new location based experience/location based application is represented by an icon 314) and the icon 314 is associated with a boundary 316 that goes beyond the boundary 312, the geofence 302 can be expanded with a new boundary 318. Thus, the geofence 302 can be updated (e.g., increased or shrunk) to encompass icons and/or boundaries associated with the icons.

In some examples, if a UE is within a boundary associated with a location based experience (e.g., within a boundary 316 for the icon 314 or within a boundary 320 for the icon 304 the user can interact with the location based application. In some cases, the various location based applications can be associated with different initial conditions, such as time, funds, etc. Additional details are discussed in FIGS. 4 and 5 as well as throughout the disclosure.

FIGS. 2, 4-6, and 9 illustrate example processes and sequence diagrams in accordance with examples of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order, omitted, and/or performed in parallel to implement the processes.

For ease of illustration, the base station 104 and associated signaling are not shown in the sequence diagrams.

Figure 4:
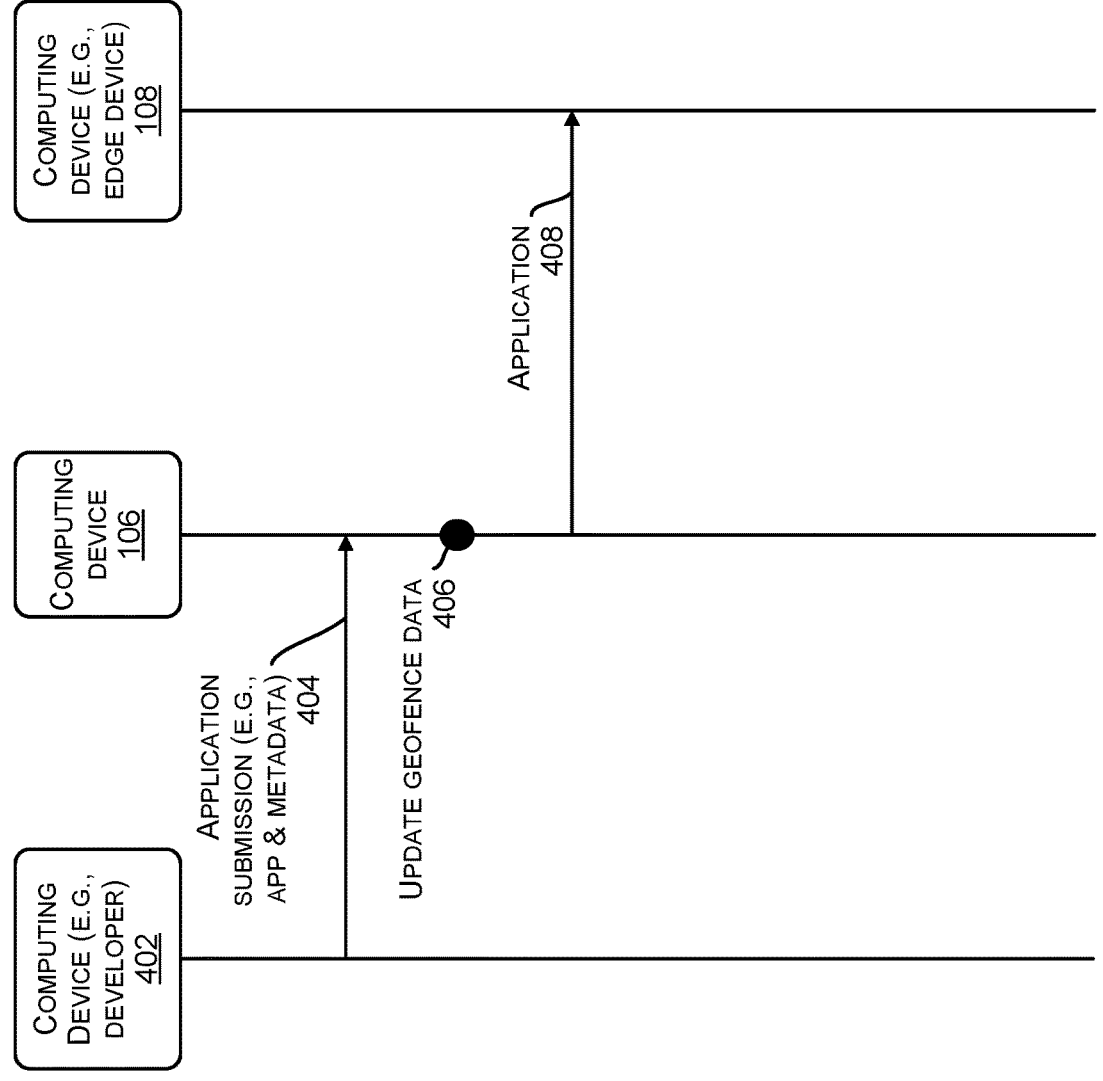
FIG. 4 depicts a sequence diagram of example operations and messages for receiving a location based application and deploying it within a network.
Figure 4:

FIG. 4 depicts a sequence diagram 400 of example operations and messages for receiving a location based application and deploying it within a network.

A computing device (e.g., a developer) 402 can write a location based application and, at point 404, the computing device 402 can submit the application to the computing device 106 (e.g., comprising the edge deployment management component 110). In some examples, the application can include instructions to be executed on a UE and/or on an edge computing device. In some examples, metadata can include, but is not limited to, an application identifier, location data, radius data, time data, cost data, and the like.

At point 406, the computing device can update geofence data based on the application submission 404. For example, the computing device 106 can determine that the new location based application is associated with (e.g., falls within) an existing geofence. If the application location does not fall within an existing geofence area, the computing device 106 can generate a new geofence (or can expand the boundaries associated with an existing geofence to include the new location). If a location associated with an application falls within an existing geofence but the boundary (e.g., the boundary 316) extends beyond a geofence, the computing device 106 can expand one or more boundaries of the geofence to encompass the location and boundaries associated with the location based application.

At point 408, the computing device 106 can send the application to the computing device 108 representing an edge node with respect to the application associated with the application. For example, a first application associated with a first location may be sent to a first edge computing device but a second application associated with a second location different than the first location may be sent to a second edge computing device that is different from the first edge computing device. In some examples, the computing device 106 can select the edge server based on the location data included in the metadata. In some examples, the computing device 106 can select or determine an edge computing device based on expected latency between the edge device and the location of the location based application, Quality of Service (QOS) metrics, bandwidth, throughput, rendering requirements, and the like.

Figure 5:
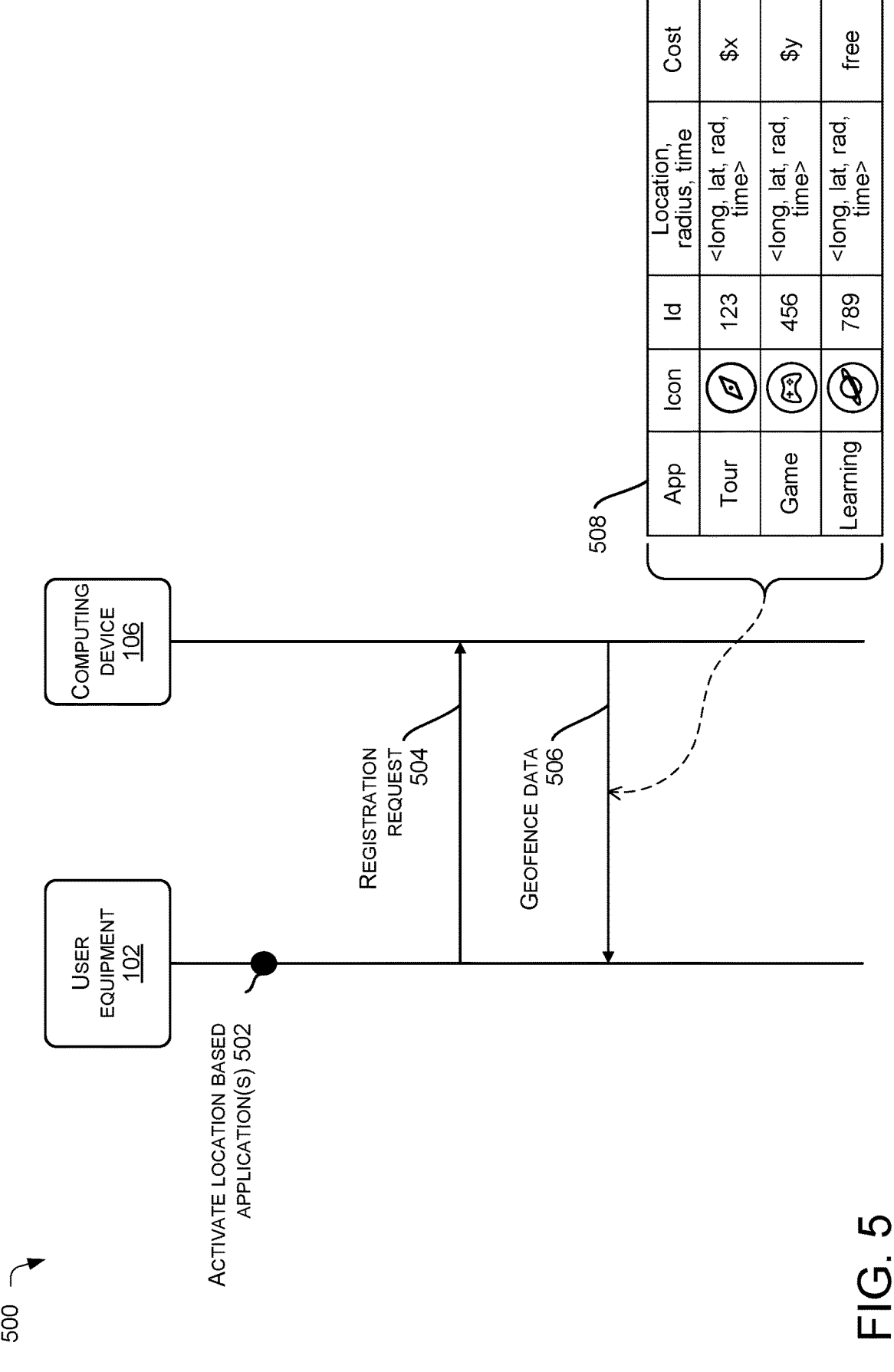
FIG. 5 depicts a sequence diagram of example operations and messages for registering a user equipment to use a location based application on a network.

FIG. 5 depicts a sequence diagram 500 of example operations and messages for registering a user equipment to use a location based application on a network.

A UE 102 can activate one or more location based application(s) at point 502. In some examples, the UE 102 can accept terms and conditions, activate a setting, or download a rendering client for rendering a location based application.

At point 504, the UE 102 can send a registration request 504 to the computing device. In some examples, the registration request 504 can include the UE 102 establishing a connection with a base station (not shown) in particular coarse geographic area. In some examples, the UE 102 can send the registration request 504 each time it connects to a base station, in connection with a RRC reconfiguration message, and the like.

In response to the registration request 504, the computing device 106 can send geofence data 506 to the UE 102. The example 508 illustrates geofence data 506 for three applications, illustrated by the three substantive rows in the table in the example 508. In some examples, the geofence data 506 for a first application can include a type of application (e.g., "Tour"), an icon to display on a UE (e.g., when the UE is within the geofence area), an application identifier (e.g., 123), location/radius/time information (e.g., latitude and longitude information, radius information (e.g., in meters, kilometers, miles, etc. where the application can be executed), time (e.g., indicating when the application is active or inactive), cost to use the application, and the like. As can be understood, there can be more or fewer parameters associated with such geofence data 506.

In some examples, in response to receiving the geofence data 506, the UE 102 can determine its location with respect to the geofence data and can display or otherwise present indication(s) associated with such location based applications for launching the application, as discussed throughout the disclosure.

Figure 6:
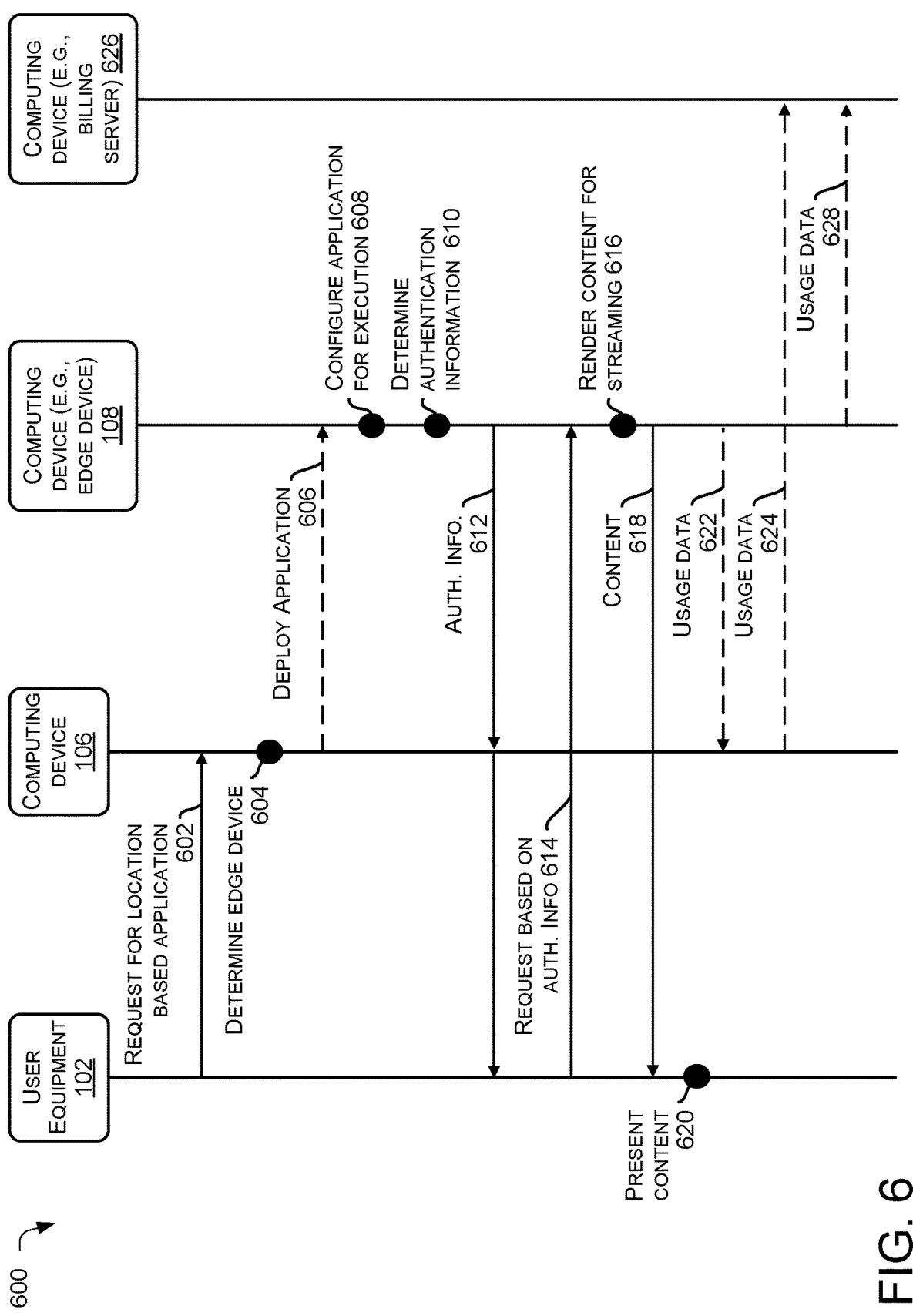
FIG. 6 depicts a sequence diagram of example operations and messages for activating a location based application in a network to generate content at an edge device and to render the content at a user equipment.

FIG. 6 depicts a sequence diagram 600 of example operations and messages for activating a location based application in a network to generate content at an edge device and to render the content at a user equipment.

At point 602, the UE 102 can send a request for a location based application to a computing device 106. In some examples, the request for the location based application can include the user responding to an indication that a location based application is available and selecting the application to begin operation. In some examples, the request can further include a location of the UE 102, an identifier of the location based application being invoked, billing information, and the like.

At point 604, the computing device 106 can determine an edge device to instantiate the location based application. In some examples, the edge device can be determined based on the expected location of the services to be provided, an expected latency, QoS level, available bandwidth, radio connection type (e.g., 3G/4G/5G, etc.), rendering capabilities, processing capabilities, congestion, and the like.

In some examples, if the computing device determines an edge device to host the particular location based application, and that edge device does not have the application deployed at the particular edge device, the computing device 106 can deploy the application to the edge computing device 108 at point 606. If the application is to be deployed, the computing device 108 can configure the application for execution at point 608, which can include installing and/or instantiating the application in a virtual machine and/or container.

At point 610, and at least partially in response to the computing device 106 sending a request to configure the application for execution for the UE 102, the computing device 108 can determine authentication information. In some examples, the computing device 108 can input information associated with the UE 102 (e.g., user profile information, identifying information such as a MAC address, a public key, etc.), information associated with the edge device 108 (e.g., an identifier associated with the edge device), an identifier associated with the application (e.g., an application identifier) to a hashing function to generate a user token for the UE 102. This user token (also referred to as an authentication token or as authentication information) can be unique to the particular combination of UE 102, the edge device 108, and the location based application to be executed.

At point 612, the computing device can send the authentication information via the computing device 106 to the UE 102.

In response, at point 614, the UE can send a request for the location based application to the computing device 108, wherein the request is based on the authentication information. In this manner, and in some examples, the UE 102 can establish a connection directly with the computing device 108 without extra latency of signaling through the computing device 106. In some examples, the request based on authentication information of point 614 can also include location data associated with the UE, including UE specific data (e.g., display resolution, an orientation, field of view, etc.) associated with the UE 102 for generating and/or rendering augmented reality components.

At point 616, the computing device 108 can render content for streaming. In some examples, the rendered content can be based on the precise location data provided by the UE 102.

At point 618, the computing device 108 can send the content to the UE 102, which can be presented via the UE at point 620.

As can be understood, the UE 102 can continuously send location and/or pose data associated with the UE 102 to the computing device 108 for additional content to be rendered at the computing device 108 and presented at the UE 102.

At point 622, the computing device 108 can send usage data to the computing device 106.

In some examples, and in response to receiving the usage data 622 (where applicable) the computing device 106 can send usage data 624 to a computing device 626 (e.g., a billing server). At point 628, in some examples, the computing device 108 can send usage data directly to the billing server 626, which can track usage and/or prepare billing information based on usage and costs associated with the location based application. The billing server 626 can charge a user account associated with the UE for use of the location based applications as discussed herein.

Figure 7:
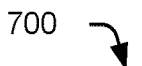
FIG. 7 depicts an example system architecture for a fifth generation (5G) telecommunication network.
Figure 7:
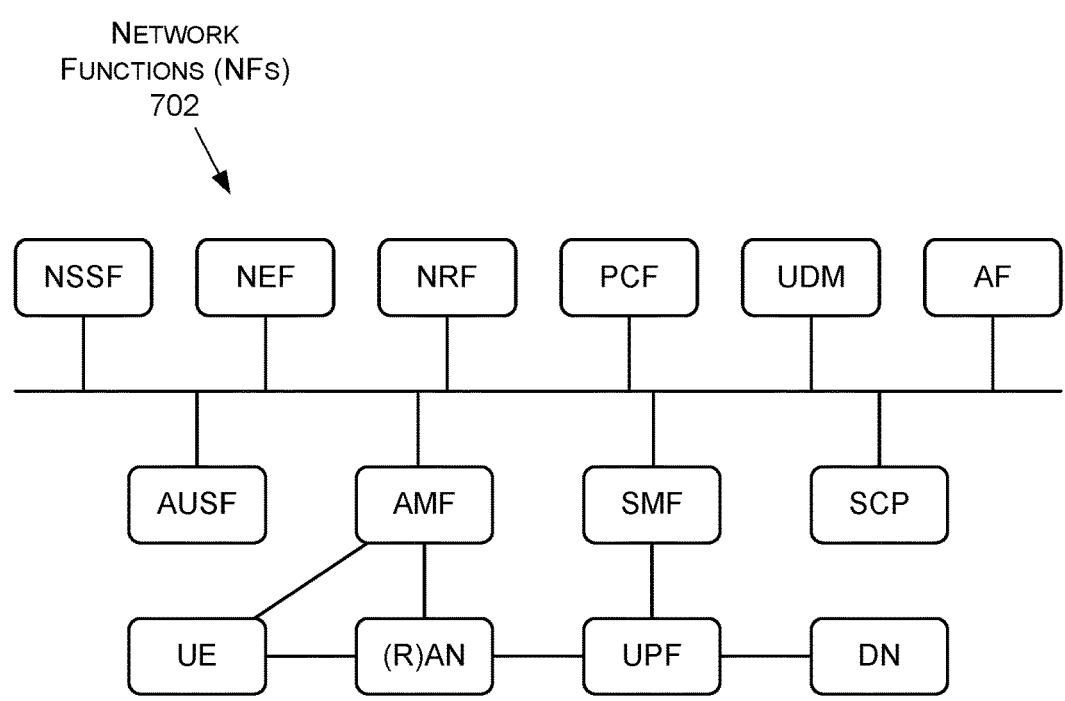

FIG. 7 depicts an example system architecture for a fifth generation (5G) telecommunication network. In some examples, the telecommunication network can comprise the networks elements in FIG. 1 (and/or other elements discussed throughout this application) that includes a service-based system architecture in which different types of network functions (NFs) 702 operate alone and/or together to implement services. Standards for 5G communications define many types of NFs 702 that can be present in 5G telecommunication networks, including but not limited to an Authentication Server Function (AUSF), Access and Mobility Management Function (AMF), Data Network (DN), Unstructured Data Storage Function (UDSF), Network Exposure Function (NEF), Network Repository Function (NRF), Network Slice Selection Function (NSSF), Policy Control Function (PCF), Session Management Function (SMF), Unified Data Management (UDM), Unified Data Repository (UDR), User Plane Function (UPF), Application Function (AF), User Equipment (UE), (Radio) Access Network ((R)AN), 5G-Equipment Identity Register (5G-EIR), Network Data Analytics Function (NWDAF), Charging Function (CHF), Service Communication Proxy (SCP), Security Edge Protection Proxy (SEPP), Non-3GPP Inter-Working Function (N3IWF), Trusted Non-3GPP Gateway Function (TNGF), and Wireline Access Gateway Function (W-AGF).

One or more of the NFs 702 of the core network(s) can be implemented as network applications that execute within containers (not shown). The NFs 702 can execute as hardware elements, software elements, and/or combinations of the two within telecommunication network(s), and accordingly many types of the NFs 702 can be implemented as software and/or as virtualized functions that execute on cloud servers or other computing devices. Network applications that can execute within containers can also include any other type of network function, application, entity, module, element, or node.

Figure 8:
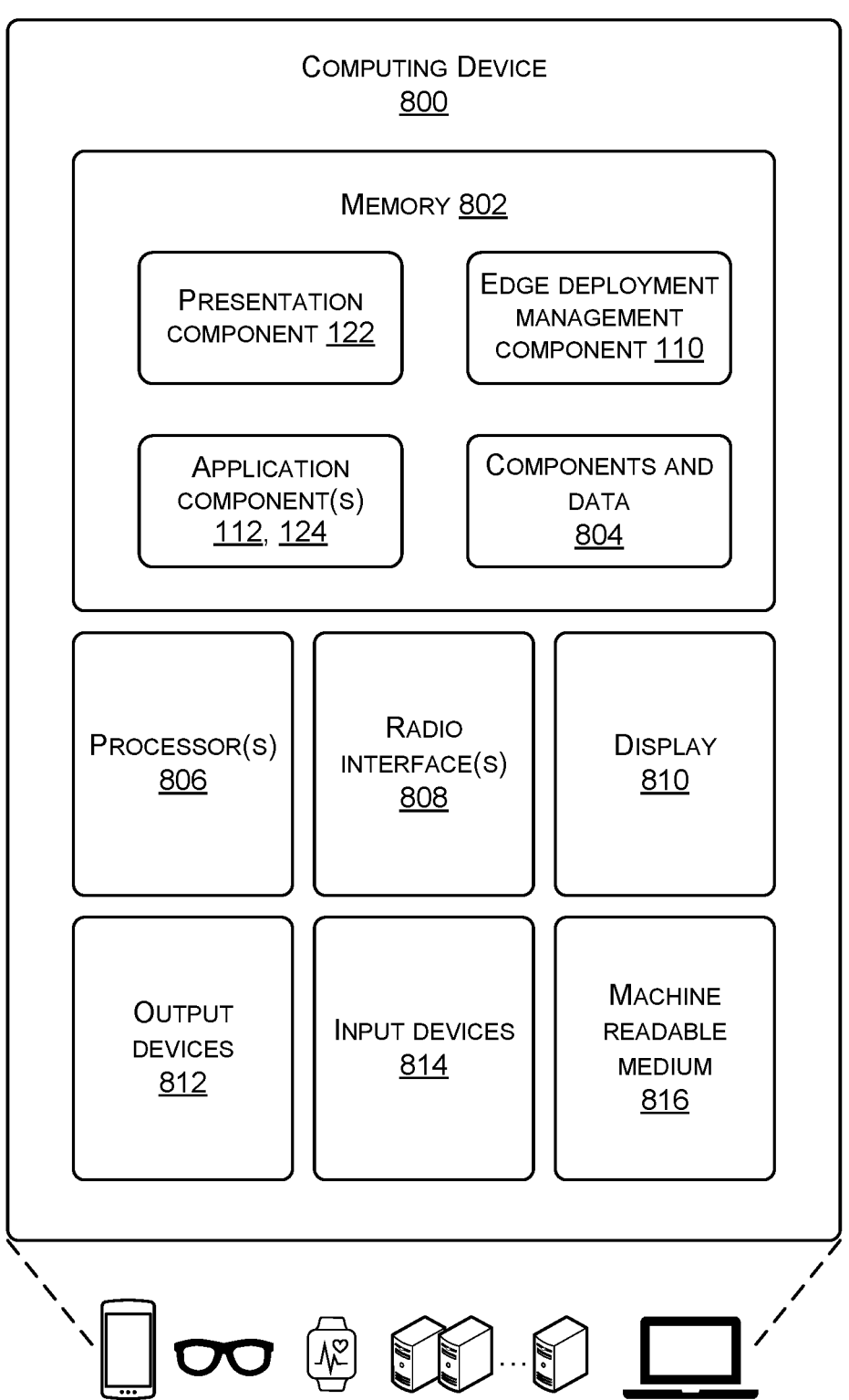
FIG. 8 depicts an example system architecture for a computing device.

FIG. 8 depicts an example system architecture for a computing device 800, in accordance with various examples. In some examples, the computing device 800 can represent the UE 102, the computing device 106, and/or the computing device 108. As shown, the computing device 800 can have memory 802 storing the presentation component 122, the edge deployment management component 110, the application component(s) 112 and/or 124, and other components and data 804. The computing device 800 can also comprise processor(s) 806, radio interfaces 808, a display 810, output devices 812, input devices 814, and/or a machine readable medium 816.

In various examples, the memory 802 can include system memory, which may be volatile (such as RAM), non-volatile (such as ROM, flash memory, etc.) or some combination of the two. The memory 802 can further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other non-transitory medium which can be used to store desired information and which can be accessed by the computing device 800. Any such non-transitory computer-readable media may be part of the computing device 800.

Details of the presentation component 122, the edge deployment management component 110, and the application component(s) 112 and/or 124 are discussed throughout this disclosure and generally implement location based applications, as discussed herein.

The other components and data 804 can be utilized by the computing device 800 to perform or enable performing any action taken by the computing device 800. The components and data 804 can include a UE platform, operating system, and applications, and data utilized by the platform, operating system, and applications.

In various examples, the processor(s) 806 can be a central processing unit (CPU), a graphics processing unit (GPU), or both CPU and GPU, or any other type of processing unit. Each of the one or more processor(s) 806 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 806 may also be responsible for executing all computer applications stored in the memory 802, which can be associated with common types of volatile (RAM) and/or nonvolatile (ROM) memory.

The radio interfaces 808 can include transceivers, modems, interfaces, antennas, and/or other components that perform or assist in exchanging radio frequency (RF) communications with base stations of the telecommunication network, a Wi-Fi access point, and/or otherwise implement connections with one or more networks. For example, the radio interfaces 808 can be compatible with multiple radio access technologies, such as 5G radio access technologies and 4G/LTE radio access technologies. Accordingly, the radio interfaces 808 can allow the computing device 800 to connect to various components as described herein.

The display 810 can be a liquid crystal display or any other type of display commonly used in computing devices. For example, display 810 may be a touch-sensitive display screen, and can then also act as an input device or keypad, such as for providing a soft-key keyboard, navigation buttons, or any other type of input. The output devices 812 can include any sort of output devices known in the art, such as the display 810, speakers, a vibrating mechanism, and/or a tactile feedback mechanism. Output devices 812 can also include ports for one or more peripheral devices, such as headphones, peripheral speakers, and/or a peripheral display. The input devices 814 can include any sort of input devices known in the art. For example, input devices 814 can include a microphone, a keyboard/keypad, and/or a touch-sensitive display, such as the touch-sensitive display screen described above. A keyboard/keypad can be a push button numeric dialing pad, a multi-key keyboard, or one or more other types of keys or buttons, and can also include a joystick-like controller, designated navigation buttons, or any other type of input mechanism.

The machine readable medium 816 can store one or more sets of instructions, such as software or firmware, that embodies any one or more of the methodologies or functions described herein. The instructions can also reside, completely or at least partially, within the memory 802, processor(s) 806, and/or radio interface(s) 808 during execution thereof by the computing device 800. The memory 802 and the processor(s) 806 also can constitute machine readable media 816.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

FIG. 9 depicts an example process 900 for deploying a location based application in a telecommunication system. Some or all of the process 900 may be performed by one or more components in FIGS. 1 and 4-8, as described herein. For example, some or all of process 900 may be performed by the computing device 106 of FIG. 1.

At operation 902, the process may include receiving, at a first server, a location based application and metadata associated with the application. In some examples, the location based application can be received from a developer for use in the telecommunication network associated with the first server. In some examples, the telecommunication network can be a 5G network and the first server can be a network function or computing device of the 5G network.

At operation 904, the process may include receiving, from a user equipment (UE), an indication that the location based application is activated and/or authorized. For example, a user or a user profile associated with the UE can accept terms and conditions to begin using a location based application. In some examples, the UE can install a location based application or activate a location tracking service on the UE to provide to the network. In some examples, the indication can include a coarse location of the UE and/or location information associated of a base station to which the UE is wirelessly connected.

At operation 906, the process may include sending based on the indication, geofence data to the UE. In some examples, the geofence data can be based on the coarse location data sent in the operation 904. In some examples, the geofence data can include an area of an environment in which to present one or more indications on the UE that location based application(s) are available. As discussed herein, the geofence data can include an application icon, an application type, an application identifier, location data, radius data, time data, cost data, other requirements, and the like.

At operation 908, the process may include receiving, from the UE, a selection of the location based application. For example, a user of the UE may select, touch, or otherwise activate a location based application to launch at the UE.

At operation 910, the process may include sending to a second server, a request to initiate the location based application. In some examples, the second server can be an edge server in the telecommunication network configured to instantiate the location based application for the UE. In some examples, the request can include information associated with the UE (e.g., identifying information, location information, type/capability information, and the like) and/or the location based application.

At operation 912, the process may include receiving, from the second server, authentication information. In some examples, the second server can generate a user token by hashing the UE identifying information, the application information, and information identifying the second server, although other information can be used to determine authentication information.

At operation 914, the process may include sending the authentication information to the UE to cause the UE to receive data from the second server. For example, the UE can establish, based on the authentication information, a connection between the UE and the second server. Such a connection can be a low latency connection such that the second server can generate content to send to the UE so that the UE can render the content at the UE based on fine location data of the UE (e.g., pose data, field of view, etc.). Accordingly, the first server (e.g., implementing the edge deployment management component discussed herein) can facilitate efficient deployment and instantiation of location based application or location based experiences in a telecommunication environment.

In some examples, in response to the deployment of the location based application in the telecommunication system, and in response to the orchestration by the computing device 106, the computing device 108 can push (or otherwise send) content to the UE 102 for presentation via the UE 102. In some examples, the UE 102 can request (e.g., pull) content directly from the computing device 108, and in some examples, a combination of pushing and pulling content to/by the UE 102 can be used.

CONCLUSION

Although the subject matter has been described in language specific to structural features and/or methodological acts, it is to be understood that the subject matter is not necessarily limited to the specific features or acts described above. Rather, the specific features and acts described above are disclosed as example embodiments.

While one or more examples of the techniques described herein have been described, various alterations, additions, permutations and equivalents thereof are included within the scope of the techniques described herein. For instance, techniques described in FIGS. 5 and 6 can be combined in various ways.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A method comprising:

receiving, at a first server of a Fifth-Generation (5G) network, a location based application and metadata associated with activating the location based application;

receiving, from a user equipment (UE), an indication that a user associated with the UE has activated a setting associated with authorizing location based applications;

sending, based on the indication and by the first server, geofence data to the UE associated with one or more location based applications;

receiving, from the UE and based on the UE being within a geofence based on the geofence data, a selection of the location based application;

sending, by the first server and to a second server, a request to initiate the location based application;

receiving, at the first server and from the second server, an authentication token associated with the location based application; and sending, from the first server to the UE, the authentication token to the UE causing the UE to receive data from the second server, the data associated with rendering content of the location based application.

2. The method of claim 1, further comprising:

determining, based on the selection, whether the second server includes an instance of the location based application;

determining that the second server does not include the instance of the location based application; and sending a request to the second server to install the location based application on the second server to respond to requests to UEs associated with the location based application.

3. The method of claim 1, wherein the second server is an edge server selected based on the metadata associated with activating the location based application.

4. The method of claim 1, wherein the metadata comprises at least location data associated with the location based application, radius data, and time data.

5. The method of claim 1, wherein the location based application comprises one or more of: a route finding application, a retail based application, a traffic application, or an entertainment application.

6. The method of claim 1, further comprising:

sending, by the first server, usage data of the location based application to a billing server for charging a user account associated with the UE for use of the location based application.

7. The method of claim 1, wherein the location based application is a first location based application, the method further comprising:

receiving a second location based application;

updating, as updated geofence data, the geofence data based on second metadata associated with the second location based application; and sending the updated geofence data to the UE.

8. The method of claim 1, wherein the location based application includes an augmented reality based application.

9. A system comprising:

one or more processors; and one or more non-transitory computer-readable media storing computer-executable instructions that, when executed by the one or more processors, cause the system to perform operations comprising:

receiving, at a first server of a Fifth-Generation (5G) network, a location based application and metadata associated with activating the location based application;

receiving, from a user equipment (UE), an indication that a user associated with the UE has activated a setting associated with authorizing location based applications;

sending, based on the indication and by the first server, geofence data to the UE associated with one or more location based applications;

receiving, from the UE and based on the UE being within a geofence based on the geofence data, a selection of the location based application;

sending, by the first server and to a second server, a request to initiate the location based application;

receiving, at the first server and from the second server, an authentication token associated with the location based application; and sending, from the first server to the UE, the authentication token to the UE causing the UE to receive data from the second server, the data associated with rendering content of the location based application.

10. The system of claim 9, the operations further comprising:

determining, based on the selection, whether the second server includes an instance of the location based application;

determining that the second server does not include the instance of the location based application; and sending a request to the second server to install the location based application on the second server to respond to requests to UEs associated with the location based application.

11. The system of claim 9, wherein the second server is an edge server selected based on the metadata associated with activating the location based application.

12. The system of claim 9, wherein the metadata comprises at least location data associated with the location based application, radius data, and time data.

13. The system of claim 9, the operations further comprising:

sending, by the first server, usage data of the location based application to a billing server for charging a user account associated with the UE for use of the location based application.

14. The system of claim 9, wherein the location based application is a first location based application, the operations further comprising:

receiving a second location based application;

updating, as updated geofence data, the geofence data based on second metadata associated with the second location based application; and sending the updated geofence data to the UE.

15. One or more non-transitory computer-readable media storing instructions executable by one or more processors, wherein the instructions, when executed, cause the one or more processors to perform operations comprising:

receiving, at a first server of a Fifth-Generation (5G) network, a location based application and metadata associated with activating the location based application;

receiving, from a user equipment (UE), an indication that a user associated with the UE has activated a setting associated with authorizing location based applications;

sending, based on the indication and by the first server, geofence data to the UE associated with one or more location based applications;

receiving, from the UE and based on the UE being within a geofence based on the geofence data, a selection of the location based application;

sending, by the first server and to a second server, a request to initiate the location based application;

receiving, at the first server and from the second server, an authentication token associated with the location based application; and sending, from the first server to the UE, the authentication token to the UE causing the UE to receive data from the second server, the data associated with rendering content of the location based application.

16. The one or more non-transitory computer-readable media of claim 15, the operations further comprising:

determining, based on the selection, whether the second server includes an instance of the location based application;

determining that the second server does not include the instance of the location based application; and sending a request to the second server to install the location based application on the second server to respond to requests to UEs associated with the location based application.

17. The one or more non-transitory computer-readable media of claim 15, wherein the second server is an edge server selected based on the metadata associated with activating the location based application.

18. The one or more non-transitory computer-readable media of claim 15, wherein the metadata comprises at least location data associated with the location based application, radius data, and time data.

19. The one or more non-transitory computer-readable media of claim 15, the operations further comprising:

sending, by the first server, usage data of the location based application to a billing server for charging a user account associated with the UE for use of the location based application.

20. The one or more non-transitory computer-readable media of claim 15, wherein the location based application is a first location based application, the operations further comprising:

receiving a second location based application;

updating, as updated geofence data, the geofence data based on second metadata associated with the second location based application; and sending the updated geofence data to the UE.

* * * * *